United States Patent [19]
Golze et al.

[11] 3,827,740
[45] Aug. 6, 1974

[54] STRUCTURALLY REINFORCED VEHICLE BUMPER

[75] Inventors: Richard R. Golze, Bloomfield Hills; Richard F. Kienle, Bloomfield Township, both of Mich.

[73] Assignee: Rockwell International Corporation, Pittsburgh, Pa.

[22] Filed: May 18, 1972

[21] Appl. No.: 254,466

[52] U.S. Cl. .................................. 293/98, 29/470.5
[51] Int. Cl. ............................................ B60r 19/04
[58] Field of Search ........ 293/70, 98, 69; 29/155 R, 29/470.5; 52/731

[56] References Cited
UNITED STATES PATENTS

| | | | |
|---|---|---|---|
| 496,465 | 5/1893 | White | 52/731 |
| 3,332,197 | 7/1967 | Hinkle | 52/731 |
| 3,482,653 | 12/1969 | Shinmaki et al. | 293/70 |
| 3,605,994 | 9/1971 | Parlette | 52/731 |
| 3,702,202 | 11/1972 | Rumsey | 293/83 |

*Primary Examiner*—M. Henson Wood, Jr.
*Assistant Examiner*—Robert Saifer

[57] ABSTRACT

A structurally reinforced vehicle bumper assembly comprising a plurality of outer members secured together to define a closed bumper configuration having an internal chamber. A bumper reinforcing structural element is positioned within this chamber and is secured to and interconnects two outer members. This structural element is joined to one of these outer members by adhesive material, thereby permitting the assembly of the composite bumper.

2 Claims, 3 Drawing Figures

PATENTED AUG 6 1974  3,827,740
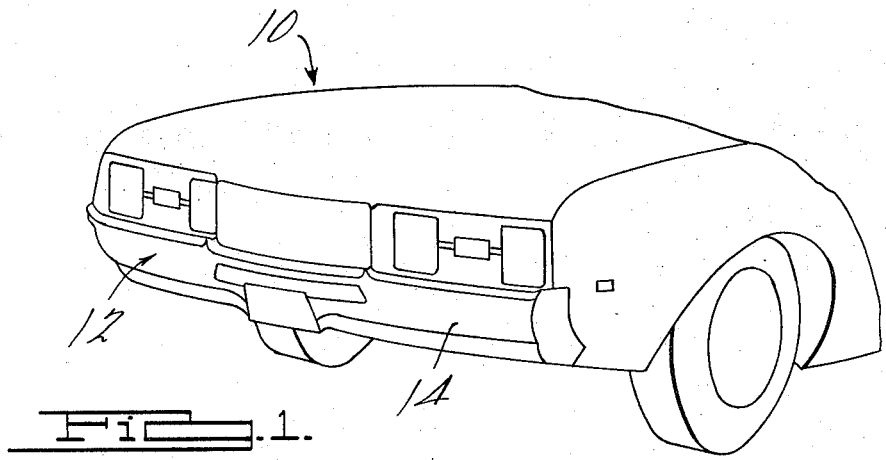
FIG. 1.
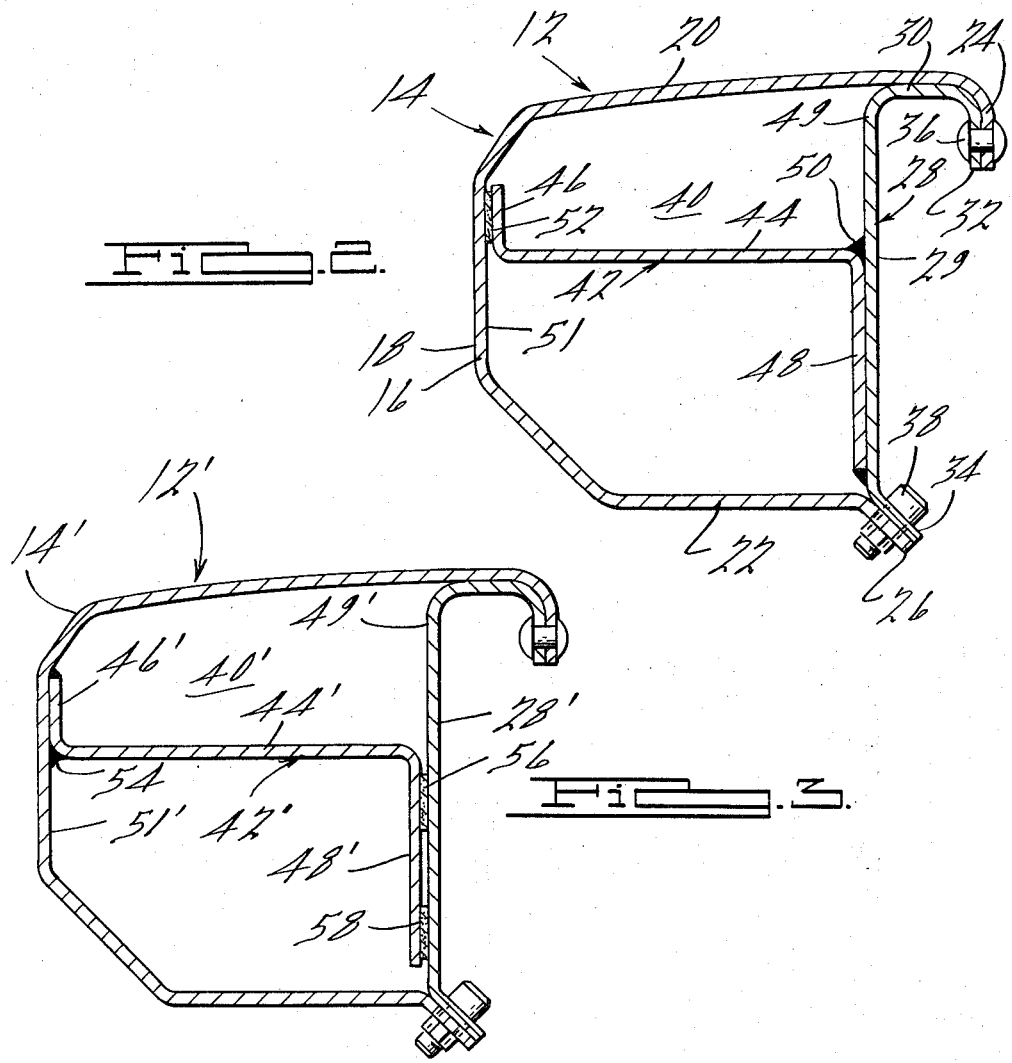
FIG. 2.
FIG. 3.

STRUCTURALLY REINFORCED VEHICLE BUMPER

BACKGROUND OF THE INVENTION

In order to provide a vehicle bumper having a relatively high resistance to deformation and other damage due to impact forces as would occur during a vehicle collision, it is well known to form the external bumper member so that it has a generally rectangular or box-shaped cross section. The desirability of such a bumper on motor vehicles, especially in combination with energy absorbing devices connecting the bumper to the vehicle frame, greatly has increased with the inclusion in vehicle design parameters of schemes for eliminating or greatly reducing damage to the vehicle due to low speed collisions. In fact, in response to design requirements that have arisen in the art, various schemes have been contemplated for modifying the basic box-shaped cross section bumper to increase to even greater levels the already high resistance of this type of bumper to impact damage.

The structural strength, and hence deformation resistance, of the box-shaped bumper greatly may be increased by the addition of a reinforcing member extending from the inner surface of the outermost bumper wall that will be impacted as during a minor vehicle collision and the wall of the bumper opposite the impacted wall. Such a reinforcing member or strut is capable of resisting great forces applied along its length to prevent deformation of the outermost bumper wall. Prior to this invention, however, a box-shaped bumper design so reinforced has not been known that will allow for simple manufacture and feasible assembly procedures.

It is therefore an object of this invention to provide a structurally reinforced vehicle bumper of the box-shaped cross section type. A further object of this invention is to provide a structurally reinforced bumper having a novel design permitting manufacture of the bumper parts by conventional methods. A still further object of this invention is to provide a reinforced, box-shaped bumper having a design permitting ease of assembly, including the assembly of an internal strut interconnecting the external bumper members.

SUMMARY OF THE INVENTION

A structurally reinforced vehicle bumper assembly constructed in accordance with this invention includes a plurality of outer members secured together to define a closed bumper configuration having an internal chamber. A bumper reinforcing structural element is positioned within this chamber and is secured to and interconnects the two outer members. This structural element is joined to at least one of the outer members by an adhesive material, thereby permitting the assembly of the composite bumper and the joining of the structural element and said one outer member at the time of this assembly.

DESCRIPTION OF THE DRAWINGS

FIG. 1 is an isometric view of the front portion of a motor vehicle having a structurally reinforced vehicle bumper according to this invention;

FIG. 2 is a cross sectional view taken through the bumper of the motor vehicle of FIG. 1; and FIG. 3 is a view similar to FIG. 2 but illustrating a modification of the structurally reinforced vehicle bumper of this invention.

DETAILED DESCRIPTION OF THE INVENTION

Referring now in detail to the drawing and in particular to FIGS. 1 and 2 thereof, the numeral 10 denotes generally the front end of a motor vehicle having a structurally reinforced bumper 12 constructed in accordance with this invention. The bumper 12 is a composite assembly and includes an elongate outer member 14 extending substantially across the width of the vehicle and having a C-shaped cross section. Member 14 has a substantially vertically oriented main body 16 having an outer surface 18 that will be impacted in the event the motor vehicle associated with the bumper 13 is involved in a collision involving the front portion of this vehicle. Extending substantially horizontally rearward from main body 16 are upper and lower arms 20 and 22. Upper arm 20 is formed with a downwardly extending flange 24 and lower arm 22 is formed with a downwardly extending flange 26.

A rear structural member 28 has a substantially vertically extending main body 29 extending between arms 20 and 22. The uppermost extremity of member 28 is formed with a hook-shaped projection 30 having downwardly disposed end portion 32. The lower extremity of member 28 is formed with an outwardly extending flange 34.

Members 14 and 28 are dimensioned so that hook-shaped projection 30 is adapted to fit inside flange 24 of arm 20 so that end 32 of projection 30 lies against the inside surface of flange 24. With the parts in this orientation, flange 34 of member 28 lies against the surface of flange 26 on lower arm 22. It thus readily may be appreciated that members 14 and 28 may be secured together by fastener means to form a composite bumper having a generally box-shaped cross section. Such fastener means are shown on the drawing for purposes of illustration only as a rivet 36 securing flange 24 and projection end 32 together, and nut and bolt assembly 38 securing flanges 26 and 34 together. The composite bumper so formed defines a central chamber identified by the reference numeral 40.

Within the central chamber 40 is located the structural reinforcing strut 42 having a generally horizontally extending main body 44 and with vertical front and rear flanges 46 and 48 respectively extending in opposite directions from main body 44. Strut 42 is dimensioned so that with rear flange 48 in intimate contact with interior surface 49 of rear member 28, front flange 46 will be spaced a slight distance apart from interior surface 51 of main body 16 of outer member 14.

As the impact forces to bumper 12 generally are horizontally applied, the horizontally disposed main body 44 of strut 42 greatly increases the resistance to deformation of bumper 12 caused by these forces. This is because in compression, main body 44 is capable of resisting extremely large forces. It has been found, however, that the force resisting capabilities of strut 42 greatly are reduced if the strut 42 is not securely joined to outer member 14 and rear member 28. For this reason, flanges 46 and 48 are permanently secured to surfaces 51 and 49 respectively in the manner to be described in detail below.

It is readily apparent from an inspection of the structure illustrated by FIG. 2 of the drawings that assembly of the composite bumper 12 cannot be accomplished utilizing only conventional techniques for joining metal in the fabrication of vehicle bumpers. This is because the strut 42 is joined to opposite walls of the structure defining a closed chamber. For example, if strut 42 is to be secured in place utilizing only welding and if the strut is welded to member 28 prior to the assembly of member 28 to member 14, subsequent welding of strut 42 to the member 14 is impossible. The converse is also true in that if the weld of the strut 42 to member 14 occurs prior to the assembly of the outer member to the inner member 28, subsequent welding of the strut to the inner member 28 cannot be accomplished.

The design of structurally reinforced bumper assembly 12 avoids this difficulty of assembly by utilizing as a joining medium an adhesive substance to join the strut 42 to one of the structural members 14 or 28. As may be seen in FIG. 2, strut 42 is welded to inner surface 49 of rear member 28. This welding is accomplished prior to the assembly of member 28 to member 14 by fastener means 36 and 38. With the subassembly constituting member 28 and strut 42 previously fabricated, the surface of front flange 46 of strut 42 most remote from member 28 is coated with adhesive material 52. When the subassembly comprising strut 42 and rear member 28 is secured to outer member 14 to form the bumper assembly, the adhesive covered surface of flange 46 is brought into proximity with inner surface 51 of the outer member 14 and the adhesive is brought into contact with surface 51. The curing of the adhesive accomplishes a permanent joining of flange 46 to surface 51 and the completion of the bumper assembly. Suitable adhesive materials for purposes of this invention are a group of adhesives sold under the generic names vinyl, epoxy and urethane cements.

In FIG. 3, wherein parts like those described with reference to FIGS. 1 and 2 above are identified by similar but primed reference numerals, a modification of the bumper assembly of FIG. 2 is shown. In this modification, strut 42' initially is secured to internal surface 51' of outer member 14' to form a subassembly by means of the weld 54. The surface of rear flange 48' of strut 42' then is coated at two portions 56 and 58 thereof with adhesive material. The subsequent assembly of rear bumper member 28' to member 14' will cause this adhesive material to come into contact with rear surface 49' of member 28' and accomplish the requisite joining of the flange 48' to surface 49'.

This invention thus provides a structurally reinforced vehicle bumper of the box-shaped cross section type having a novel design that permits manufacture of the bumper parts by conventional methods. This design also allows for the reinforced bumper to include an internal reinforcing strut that is permanently secured to opposite walls of the box-shaped bumper, but which allows for ease of assembly in a method compatible with the high volume manufacturing techniques utilized in the automotive art.

We claim:

1. A structurally reinforced vehicle bumper assembly comprising a pair of bumper members secured together to form a composite bumper having a generally box-shaped cross section and a closed internal chamber, and a reinforcing element within said chamber extending between said members and secured to each of said members by joining means, the joining means securing said element to at least one of said members comprising a layer of adhesive material between said element and said one member, the joining means securing said element to the other of said members comprising weld means.

2. The bumper assembly of claim 1, wherein said reinforcing element extends substantially horizontally between said members in a direction parallel to the longitudinal vehicle axis.

* * * * *